Patented July 8, 1941

2,248,089

UNITED STATES PATENT OFFICE 2,248,089

DERIVATIVES OF POLYMERIZED ALKYLOLAMINES

Morris B. Katzman and Albert K. Epstein, Chicago, Ill., assignors to The Emulsol Corporation, Chicago, Ill., a corporation of Illinois No Drawing. Application May 17, 1937, Serial No. 143,133

13 Claims. (Cl. 260—404)

Our invention relates to new chemical compounds which have particular utility in the arts where interface modifying functions are required.

One of the objects of our invention is the preparation of new chemical compounds having utility as detergent, emulsifying, flotation, and, in general, interface modifying agents in the arts where such functions are desired.

A particular object of our invention resides in the preparation of new chemical compositions of matter which are unusually effective in enhancing the emulsification of oleaginous and aqueous materials.

Still another object of our invention deals with improvements in the preparation of oleaginous and aqueous emulsions generally and particularly cosmetic emulsions such as face creams, cold creams, and other types of creams.

A further object of our invention is concerned with new methods of preparing the novel chemical compositions which are, in part, the subject matter of the present invention.

Other objects and features of the invention will become more apparent as the description proceeds.

In general, our invention is based upon the discovery that when alkylolamines are polymerized whereby molecules of increased molecular weight containing two or more nitrogen atoms are produced, and such polymerized alkylolamines are reacted with higher molecular weight carboxylic acids, particularly higher fatty acids, or their corresponding alcohols, or with derivatives of such acids as, for example, halides, anhydrides, esters including triglycerides and the like, the resulting or final compounds have excellent interface modifying properties and are particularly efficacious in the preparation of emulsions such as cosmetic emulsions and the like.

The polymerization of the alkylolamines is conducted at elevated temperatures whereby polymers containing at least two nitrogens in the molecule are obtained. Thus, for example, two or more mols of triethanolamine, di-ethanolamine or mixtures of mono-, di- and tri-ethanolamines may be present in the polymers and there are also present therein free hydroxy groups which are capable of reaction with higher molecular weight carboxylic acids, acyl halides, triglyceride oils or fats and the like in order to produce esters of said polymerized alkylolamines. Alternatively, as indicated above, reaction may be had between the polymerized alkylolamines and higher molecular weight alcohols or compounds containing alcoholic groups whereby ethers are formed. The polymerization of the alkylolamines is effected by heating said alkylolamines at elevated temperatures, generally of the order of 200 degrees C. to 250 degrees C., preferably in the presence of a catalyst such as sodium hydroxide, potassium hydroxide, sodium ethylate, sodium glycerate, or other alkali catalysts such as disclosed hereinafter for re-esterification of triglycerides with the polymerized alkylolamines, the proportion of catalyst being variable but generally of the order of $\frac{1}{10}$% to 1%. In the case of the presence of monoethanolamine or diethanolamine or mixtures thereof or in the case of other alkylolamines having a relatively low boiling point, the polymerization may be carried out under a reflux in order not to lose some of the lower boiling point constituents. Alternatively, the volatile constituents may be distilled and recovered from the distillate by condensation. While polymerization of the alkylolamines can be effected at elevated temperatures without the use of a catalyst, it is very much preferable to use a catalyst of the character indicated whereby the speed of the reaction is enhanced and products are obtained having better color.

More specifically, the compounds of our invention may be prepared by heating an alkylolamine, such as triethanolamine, at elevated temperatures, of the order of 200° C. to 250° C., preferably in the presence of a catalyst, for a length of time, generally a matter of a few hours, until an increase in the molecular weight of the alkylolamine shows that polymerization has taken place. The resulting polymerized alkylolamine is then reacted with a higher molecular weight carboxylic acid or derivative thereof to form esters of said alkylolamine. Alternatively, although not nearly so satisfactory, the polymerized alkylolamines may be reacted with higher molecular weight alcohols or derivatives thereof to form ethers with said polymerized alkylolamines.

Among the higher molecular weight carboxylic acids which may be utilized either as such or in the form of derivatives such as acyl halides, esters, particularly triglycerides, anhydrides and the like for reaction with the polymerized alkylolamines to produce esters thereof are the following: caproic, capric, caprylic, hydroaromatic acids such as abietic acid, aromatic acids such as benzoic, benzoylbenzoic, naphthoic, toluic, and naphthenic acids, hydroxystearic acid, higher molecular weight saturated and unsaturated fatty acids, particularly those derived from natural fats and oils, such as palmitic acid, stearic, lauric, myristic, melissic, oleic, ricinoleic, linoelic, or mixed higher fatty acids derived from animal or vegetable fats and fish oils such as lard, oleo oil, coconut oil, corn oil, cottonseed oil, soya bean oil, particularly or completely hydrogenated vegetable oils such as cottonseed oil, corn oil, sesame oil, and fatty acids of various waxes such as beeswax and carnauba wax.

As stated above, we may, and preferably do, form the esters of the polymerized alkylolamines by reaction thereof with triglycerides, the reaction being one of re-esterification and being effected at elevated temperatures, preferably of the order of 200 degrees C. to 250 degrees C. although it is evident that the exact temperature employed will vary depending upon the specific nature of the reacting materials utilized, the speed of reaction desired, and whether or not a re-esterification catalyst is employed. Suitable catalysts of this type are alkaline materials such as sodium hydroxide, potassium hydroxide, alkali metal alcoholates and glycerates such as sodium ethylate and sodium glycerate, soaps such as calcium, sodium, potassium and ammonium salts of higher fatty acids, and the like. The catalyst may be dispensed with entirely and excellent results obtained or, if employed, small percentages, of the order of 0.1% to 1.0%, based on the weight of the reacting materials, or even more or less, are very effective.

The triglyceride oils and fats which may be utilized for re-esterification with the polymerized alkylolamines are derived from animal and vegetable sources and include the following: cottonseed oil, coconut oil, corn oil, sesame oil, soya bean oil, lard, oleo oil, sardine oil, fish oils, stearine, and said oils whether partially or completely hydrogenated. We have obtained particularly satisfactory products with coconut oil. Instead of re-esterification of a triglyceride with the polymerized alkylolamine, we may employ partially esterified polyhydroxy substances or polyhydric alcohols such as a mono- or di-glyceride of a higher fatty acid as, for example, mono- or di-glycerides of coconut oil fatty acids or of other higher fatty acids, or polyhydroxy substances partially esterified with higher fatty acids such as diethylene glycol mono- higher fatty acid esters. In general, these partially esterified polyhydroxy substances may be represented by the formula $$(RO)_v-X-(OH)_w$$

wherein R is a higher acyl radical, X is the carbon-hydrogen residue of the polyhydroxy substance, and $v$ and $w$ are small whole numbers. The polyhydroxy substances, the carbon-hydrogen residues of which are represented by X in the above general formula, include glycerol, glycols, polyglycerols, polyglycols, sugars, sugar alcohols, hydroxycarboxylic acids and the like. In general, when such compounds are employed in the re-esterification reaction with the polymerized alkylolamines, as described above, lower temperatures can be effectively employed. Thus, for example, in re-esterifying monostearin with polymerized commercial triethanolamine, temperatures of about 150 degrees C. have been found very suitable and the reaction appears to proceed well at a temperature even as low as about 135 degrees C. It will be appreciated, however, that the temperature of reaction will vary to some extent since some compounds are inherently more reactive than others. The disclosure herein of temperature ranges is, therefore, to be taken as illustrative or descriptive and in no sense limitative.

The alkylolamines which we employ for the initial preparation of the polymerized alkylolamines are varied and include ethanolamines such as monoethanolamine, diethanolamine, triethanolamine, and mixtures thereof such as are present in commercial triethanolamine; propanol amines, butanolamines, pentanolamines, hexanolamines, glycerol amines and mixtures thereof, as, for example:

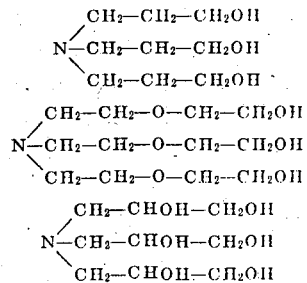

Because of commercial availability at the present time and because of the particularly satisfactory results obtained, we prefer to utilize commercial triethanolamine which contains minor percentages of mono- and diethanolamine. It is, of course, obvious that the same alkylolamine need not be used in the polymerization step. Mixtures of different alkylolamines may be employed and, in addition, mixtures of polymerized alkylolamines may be used in the subsequent esterification or etherification step of the process.

The following examples are illustrative of specific embodiments of our invention. It will be understood that they are given by way of example only, in order that those skilled in the art will have a clearer picture of how the invention may be successfully practiced, and are not to be construed as limiting our invention in any way. Thus, for example, the proportions of reacting materials, the temperature and length of time of the reaction, and other conditions may be varied without departing from the scope of our invention as defined in the appended claims.

*Example I*

To 200 parts by weight of commercial triethanolamine (containing minor proportions of mono- and di-ethanolamines) there were added 2 parts by weight of sodium hydroxide and the mixture was heated with stirring for 3 hours at 250° C. to 255° C. at which time a molecular weight determination of the reaction product showed substantially twice the molecular weight of the original commercial triethanolamine as a result of polymerization having taken place.

To 51 parts by weight of the resulting polymerized triethanolamine there were added 44 parts by weight of a partially hydrogenated cottonseed oil having a melting point of about 100° F. and the mixture was heated with stirring for 20 minutes at 250° C. whereupon the reaction mixture became homogeneous.

The resulting product, upon cooling, showed excellent emulsifying properties and had interface modifying properties.

*Example II*

To 400 parts by weight of triethanolamine there were added 3 parts by weight of sodium stearate and the mixture was heated with stirring for 4 hours at 260° C. to produce a polymerized triethanolamine.

To 200 parts by weight of said polymerized triethanolamine there were added 160 parts by weight of coconut oil and 1 part by weight of sodium hydroxide and the mass was heated for 30 minutes at 250° C. whereupon the reaction mass became homogeneous.

The resulting product, upon cooling, was an excellent emulsifying agent and had good surface modifying properties.

We have found that very valuable substances can be made by reacting the products of our invention, as described hereinabove, with various kinds of acids or acid-reacting materials of inorganic or organic character. Among the acids and acid reacting materials which we may employ are hydrochloric acid, sulphuric acid, phosphoric acids, boric acid, acid-reacting salts such as sodium acid sulphate, organic monocarboxylic, polycarboxylic, hydroxycarboxylic and otherwise substituted acids of aliphatic or aromatic character such as lactic acid, tartaric acid, oxalic acid, citric acid, malic acid, maleic acid, acetic acid, propionic acid, butyric acid, higher fatty and carboxylic acids, both saturated and unsaturated, including lauric acid, oleic acid, palmitic acid, linoleic acid, ricinoleic acid, stearic acid, hydroaromatic acids such as abietic acid, aromatic acids such as benzoic acid, naphthoic acid, and the like.

The proportions and nature of the acid utilized may vary and very novel and useful effects may be controllably obtained through this mechanism, particularly with reference to the obtention of compounds which favor oil-in-water or water-in-oil emulsions. Thus, for example, if a water-soluble polycarboxylic acid such as citric acid, is employed for reaction with the carboxylic esters of the polymerized alkylolamines in an amount such that substantially all of the acidic or carboxyl groups thereof are reacted with the basic nitrogen atom of the ester, the resulting compound is oil-soluble and tends to promote emulsions of the water-in-oil type. Again, if the higher fatty acids such as oleic acid and stearic acid are used instead of citric acid, the lipophile properties of the final compound are increased and the tendency thereof is to favor emulsion of the water-in-oil type.

In the case of water-soluble polycarboxylic and hydroxycarboxylic acids such as citric acid, however, if a large excess of such acid is used for reaction with the polymerized alkylolamine ester, the final product becomes water-soluble and tends to promote emulsions of the oil-in-water type. This is evidently due to the fact that where a large excess of citric acid, for example, is present the free or unreacted carboxyl groups of the citric acid are able to exert their hydrophilic characteristics thereby making the products more or less water-soluble with the concomitant effect upon the nature of their emulsion-favoring tendencies. It will be seen, therefore, that we have evolved novel means to control the kind of emulsifying agent which we produce. We regard this feature as an important phase of our invention.

As described above, the compounds of our invention, among other valuable properties which they possess, are excellent emulsifying agents, particularly for water-in-oil emulsions. The following examples are illustrative of such use:

(A) To make a cosmetic cream, approximately 5 parts of the reaction product produced in accordance with Example II, as described above, and substantially neutralized with commercial stearic acid, were dissolved in 15 parts of petroleum jelly. To this mixture, 40 parts of a light mineral oil heated to 40 degrees F. were added. Then, while constantly stirring, 40 parts of water at 40 degrees C. were gradually added and the stirring was continued until the mass became cool.

(B) To make a furniture polish, 4 parts of the reaction product of Example I, as described above, but substantially neutralized with commercial stearic acid, were mixed with 4 parts carnauba wax, 2 parts beeswax, 2 parts ceresin, and 52 parts of kerosene. This mixture was heated to 50 degrees C. until dissolution or dispersion of the ingredients took place and then 64 parts of water at 40 degrees C. were added slowly with constant stirring until the mixture became cool.

(C) Face cream (oil is continuous phase):

| | Parts |
|---|---|
| Product of Example I | 2 |
| Cold cream base | 26 |
| Lanolin | 4 |
| Spermaceti | 5 |
| Liquid mineral oil | 7 |
| Water | 56 |
| Ceresin | 1 |
| Citric acid | 1 |

(All parts by weight.)

NOTE.—The cold cream base comprises 7 parts light mineral oil (viscosity 65 to 75), 2 parts paraffin wax (M. P. 138 degrees F. to 140 degrees F.), and 3 parts petrolatum, all parts being by weight.

The procedure utilized in making the cream is essentially in accord with standard practice. The product of Example I is dissolved in the oleaginous material which is heated to approximately 70 degrees C. The citric acid is dissolved in the water which latter is also maintained at about 70 degrees C. The latter solution is then added to the oleaginous mixture, both at about 70 degrees C., and stirred or mixed until cool. If desired, the citric acid, dissolved in a small amount of water, may initially be admixed with the product of Example I, the remainder of the procedure being the same. Perfume and antiseptic may be added, if desired, at any suitable stage.

(D) Cold cream (oil is continuous phase):

| | Parts |
|---|---|
| Product of Example I | 2.5 |
| Cold cream base | 35.2 |
| Mineral oil | 28.0 |
| Spermaceti | 2.0 |
| Water | 32.0 |
| Citric acid | 0.25 |

(All parts by weight.) The procedure described in Example C is followed.

(E) Acid vanishing cream (water is continuous phase):

| | Parts |
|---|---|
| Product of Example I | 2.5 |
| Cold cream base | 7.5 |
| Commercial monostearin | 14.0 |
| Mineral oil | 5.0 |
| Water | 72.0 |
| Citric acid | 2.0 |

(All parts by weight.)

The product of Example I and the monostearin were added to the water solution of citric acid and heated to 80 degrees to 90 degrees C. until entirely dispersed. The mineral oil and cold cream base were heated to a like temperature and then added slowly, with stirring, to the aqueous dispersion and stirred until cool.

(F) Cold cream (oil is continuous phase):

| | Parts |
|---|---|
| Product of Example I | 2.5 |
| Cold cream base | 35.2 |
| Mineral oil | 2.0 |
| Stearic acid | 2.0 |
| Water | 32.0 |

(All parts by weight.) The procedure described in Example C is followed.

(G) Cosmetic cream (oil is continuous phase):

| | Parts |
|---|---|
| Product of Example I produced in atmosphere of steam, as hereinafter described | 2.5 |
| Cold cream base | 23.5 |
| Lanolin | 4.0 |
| Spermaceti | 6.0 |
| Mineral oil | 7.0 |
| Water | 56.0 |
| Citric acid | 0.5 |
| Ceresin | 1.0 |

(All parts by weight.) The procedure described in Example C is followed.

The emulsifying agents of our invention possess a marked advantage in that they may be utilized in the preparation of cosmetic creams such as cleansing creams to give smooth, stable products having a pH of 5 to 6, equivalent to the pH of the human skin. At present, practically all cosmetic creams have an alkaline reaction due to the use of soap or the like therein. Our invention enables the production of excellent cosmetic creams of both the oil-in-water and water-in-oil type without various of the disadvantages which formerly characterized such products.

The word "higher," as employed herein, when referring, for example, to higher molecular weight fatty acids or the like, will be understood to mean at least six carbon atoms unless otherwise specifically stated.

What we claim as new and desire to protect by Letters Patent of the United States is:

1. The process which comprises initially heating an alkylolamine at elevated temperatures in the presence of an alkaline substance acting as a catalyst whereby a substantial content of polymers is produced by the interaction of at least two mols of the alkylolamine, and then reacting the resulting polymers with a member of the group consisting of acids and alcohols containing a chain of at least six carbon atoms and derivatives thereof capable of producing esters and ethers to produce esters and ethers of said polymerized alkylolamines.

2. The process which comprises initially heating a tertiary alkylolamine at temperatures of the order of about 200 degrees C. to about 250 degrees C in the presence of an alkaline substance acting as a catalyst whereby a substantial content of polymers is produced by the interaction of at least two mols of the tertiary alkylolamine, and then reacting the resulting polymers with fatty acids containing a chain of at least six carbon atoms and derivatives thereof capable of producing esters to produce esters of said polymerized tertiary alkylolamine.

3. The process of claim 2 wherein the tertiary alkylolamine comprises predominantly triethanolamine and the fatty acids are derived from triglycerides and contain predominantly at least twelve carbon atoms.

4. The process which comprises initially heating a tertiary alkylolamine at elevated temperatures in the presence of an alkaline substance acting as a catalyst whereby a substantial content of polymers is produced by the interaction of at least two mols of the tertiary alkylolamine, and then re-esterifying a higher fatty acid glyceride with said polmerized alkylolamine at elevated temperatures to produce esters of said polymerized alkylolamine.

5. The process of claim 4 wherein the alkylolamine comprises predominantly triethanolamine, and wherein the glyceride comprises coconut oil.

6. The process of claim 4 wherein the glyceride is a member selected from the group consisting of monoglycerides and diglycerides of higher fatty acids.

7. The process which comprises initially polymerizing triethanolamine at elevated polymerizing temperatures in the presence of an alkaline substance acting as a catalyst whereby a substantial content of polymers is produced by the interaction of at least two mols of the triethanolamine, and then reesterifying about 10 parts by weight of coconut oil with an approximately equal amount by weight of said polymers of triethanolamine at a temperature between about 230 degrees C. and about 250 degrees C. to produce esters of said polymers of triethanolamine.

8. The process of claim 2, including the step of reacting the esters of the polymerized alkylolamines with a sufficient amount of a water-soluble polycarboxylic acid to impart to said esters the ability to enhance the formation of oil-in-water emulsions.

9. The process which comprises initially polymerizing an alkylolamine at elevated polymerizing temperatures to produce a substantial content of a polymer by the interaction of at least two mols of the alkylolamine, re-esterifying a higher molecular weight fatty acid triglyceride with said polymerized alkylolamine at a temperature of about 200 degrees C. to about 250 degrees C. to produce higher molecular weight fatty acid esters of said polymerized alkylolamine, and then reacting said esters with a water-soluble polycarboxylic acid to impart to said esters the ability to enhance the formation of oil-in-water emulsions.

10. The process of claim 9, wherein the water-soluble polycarboxylic acid is citric acid.

11. Reaction products of water-soluble polycarboxylic acids with carboxylic acid esters of polymerized alkylolamines containing at least two nitrogen atoms in the molecule, the carboxylic acid radicals of said esters containing at least six carbon atoms, said reaction products having the property of enhancing the formation of oil-in-water emulsions.

12. Reaction products of water-soluble polycarboxylic acids with re-esterification reaction products of polymerized alkylolamines containing at least two nitrogen atoms and a member selected from the group consisting of triglyceride oils and fats, said reaction products having the property of enhancing the formation of oil-in-water emulsions.

13. Reaction products of citric acid with re-esterification reaction products of polymerized alkylolamines containing at least two nitrogen atoms and a member selected from the group consisting of triglyceride oils and fats, said reaction products having the property of enhancing the formation of oil-in-water emulsions.

MORRIS B. KATZMAN.
ALBERT K. EPSTEIN.